United States Patent Office.

OSCAR F. BURTON, OF JERSEY CITY, NEW JERSEY.

Letters Patent No. 61,997, dated February 12, 1867.

---

IMPROVED ALLOY FOR MOULD-BOARDS AND OTHER PARTS OF PLOUGHS.

---

The Schedule referred to in these Letters Patent and making part of the same.

---

TO ALL WHOM IT MAY CONCERN:

Be it known that I, OSCAR F. BURTON, of Jersey City, in the county of Hudson, and State of New Jersey, have invented a certain new and useful improvement on Ploughs or Cultivators, of which the following is a full, clear, and exact description.

My improvement has reference to constructing the mould-board, share, or other usually metal portion of ploughs or cultivators, which work in or are exposed to the soil, of a peculiar composition or alloy that shall possess the advantages of comparative freedom from rust, with a slippery nature or character that will prevent or lessen the adhesion of soil to such parts, and that will admit of being easily and perfectly scoured. While some materials possess one or other of these advantages, they are defective in other respects as substitutes for iron in the objects mentioned. Thus steel rapidly oxidizes in some soils, and, when rusted, takes a long time to scour clean, while other materials that are free from these objections have others, such as too great brittleness and liability to warp in casting, which makes the renewal of the parts to effect a fit a matter of no little difficulty. To secure the desideratum here specified is the object of my invention, the nature of which consists in constructing the articles mentioned of an alloy, the composition of which is mainly zinc, with considerably lesser proportions of tin and copper, to which may be added comparatively very small quantities of antimony and lead, or either. From experiments made, I find that mould-boards, shares, and other parts cutting or rubbing in or on the soil, of ploughs, cultivators, and such like machines, are comparatively free from rust, easily scoured, and have a soapy or slippery character, which lessens the tendency of soil adhering to them, the advantages of all of which are well understood by farmers, agricultural implement builders, and others. I also find that such articles, constructed of an alloy as described, which readily admits of casting in any desired form, combine both tenacity and ductility. Thus the copper, as one ingredient, has the peculiar characteristic of tenacity; tin, that of ductility; antimony, where added, has a hard non-adhesive quality; and lead, great ductility; while the zinc, which forms the basis of the alloy, is comparatively cheap. In the production of this alloy for the purposes named, the proportions (in or about) of the different metals which I have found from experiments to answer best are, say fourteen (14) parts in weight of copper, the same of tin, and seventy-seven (77) parts of zinc, to which may be added three (3) parts of antimony and one (1) of lead.

What I claim as new and useful, and desire to secure by Letters Patent, is—

The manufacture of the mould-boards, shares, and other parts of ploughs and cultivators working in and exposed to the soil, of an alloy composed of copper, tin, and zinc, with or without antimony and lead, or either, substantially as specified.

OSCAR F. BURTON.

Witnesses:
J. W. COOMBS,
G. W. REED.